(12) United States Patent
Tsumeda et al.

(10) Patent No.: US 10,984,961 B2
(45) Date of Patent: Apr. 20, 2021

(54) HYBRID CAPACITOR AND MANUFACTURING METHOD THEREOF

(71) Applicant: Nippon Chemi-Con Corporation, Tokyo (JP)

(72) Inventors: Satoru Tsumeda, Tokyo (JP); Shotaro Kon, Tokyo (JP); Kenji Tamamitsu, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 122 days.

(21) Appl. No.: 16/228,687

(22) Filed: Dec. 20, 2018

(65) Prior Publication Data
US 2019/0131079 A1 May 2, 2019

Related U.S. Application Data

(63) Continuation of application No. PCT/JP2017/022320, filed on Jun. 16, 2017.

(30) Foreign Application Priority Data

Jun. 22, 2016 (JP) .............................. JP2016-124015

(51) Int. Cl.
*H01G 11/06* (2013.01)
*H01G 11/50* (2013.01)
(Continued)

(52) U.S. Cl.
CPC .............. *H01G 11/06* (2013.01); *H01G 11/24* (2013.01); *H01G 11/28* (2013.01); *H01G 11/32* (2013.01);
(Continued)

(58) Field of Classification Search
CPC ........ H01G 11/06; H01G 11/24; H01G 11/28; H01G 11/32; H01G 11/46; H01G 11/50;
(Continued)

(56) References Cited

U.S. PATENT DOCUMENTS

2004/0202934 A1  10/2004  Zaghib et al.
2007/0009798 A1   1/2007  Inagaki et al.
(Continued)

FOREIGN PATENT DOCUMENTS

CN   100464463 C   2/2009
CN   102496704 A   6/2012
(Continued)

OTHER PUBLICATIONS

International Search Report from International Patent Application No. PCT/JP2017/022320, dated Sep. 12, 2017.
(Continued)

*Primary Examiner* — Michael P McFadden
(74) *Attorney, Agent, or Firm* — SGPatents PLLC

(57) ABSTRACT

A hybrid capacitor is provided which, while improving utilization ratio of the negative electrode active substance, achieves a low DC internal resistance. This hybrid capacitor is provided with a positive electrode having a layer of a positive electrode active substance having double-layer capacitance, and a negative electrode which has a negative electrode active substance layer that can occlude and release lithium ions and that is formed from metal compound particles having a three-dimensional network structure. The 100% discharge capacity of the metal compound particles having the three-dimensional network structure is 1.25-5.0 times the 100% discharge capacity of the positive electrode active substance.

6 Claims, 9 Drawing Sheets

(51) Int. Cl.
  *H01G 11/86* (2013.01)
  *H01G 11/46* (2013.01)
  *H01G 11/24* (2013.01)
  *H01G 11/28* (2013.01)
  *H01G 11/32* (2013.01)
  *H01G 11/68* (2013.01)

(52) U.S. Cl.
  CPC ............ *H01G 11/46* (2013.01); *H01G 11/50* (2013.01); *H01G 11/86* (2013.01); *H01G 11/68* (2013.01); *Y02E 60/13* (2013.01)

(58) Field of Classification Search
  CPC ...... H01G 11/86; H01G 11/68; H01G 4/1227; H01G 4/012; H01G 4/30; H01G 11/36; H01G 11/66; H01G 11/70; H01G 11/04; H01G 11/58; Y02E 60/13; B32B 18/00; C04B 35/195; C04B 35/462; C04B 35/62685; C04B 35/62805; C04B 35/62807; C04B 35/62813; C04B 35/62823; C04B 35/62897; C04B 38/00; C04B 2235/3215; C04B 2235/3229; C04B 2235/3244; C04B 2235/3262; C04B 2237/341; C04B 2237/62; C04B 2237/704; H05K 1/03; H05K 3/46
  See application file for complete search history.

(56) References Cited

U.S. PATENT DOCUMENTS

| 2012/0009460 A1 | 1/2012 | Inagaki et al. |
| 2013/0029228 A1 | 1/2013 | Inagaki et al. |
| 2013/0115516 A1 | 5/2013 | Naoi et al. |
| 2013/0149612 A1 | 6/2013 | Takemoto et al. |
| 2014/0127586 A1* | 5/2014 | Kamizono ............ C01B 32/162 429/231.8 |
| 2014/0328005 A1 | 11/2014 | Oh et al. |
| 2015/0155107 A1 | 6/2015 | Okuno et al. |
| 2015/0255790 A1 | 9/2015 | Naoi et al. |
| 2015/0303513 A1 | 10/2015 | Hirowatari et al. |
| 2016/0196930 A1 | 7/2016 | Tsumeda et al. |

FOREIGN PATENT DOCUMENTS

| CN | 102884003 A | 1/2013 | |
| JP | 2002-270175 A | 9/2002 | |
| JP | 2003-132945 A | 5/2003 | |
| JP | 2010-280560 A | 12/2010 | |
| JP | 2012-048963 A | 3/2012 | |
| JP | 2014-086164 A | 5/2014 | |
| JP | 2014-130719 A | 7/2014 | |
| JP | 2014-203606 A | 10/2014 | |
| KR | 10-2014-0131119 A | 11/2014 | |
| TW | 201302617 A1 | 1/2013 | |
| WO | WO 2012/169331 A1 | 12/2012 | |
| WO | WO 2014/007188 A1 | 1/2014 | |
| WO | WO 2015/025764 A1 | 2/2015 | |
| WO | WO-2015025764 A1 * | 2/2015 | ............ H01G 11/50 |

OTHER PUBLICATIONS

Extended European Search Report dated Jan. 31, 2020, in European Patent Application No. 17815299.7.
Office Action dated Mar. 3, 2020 in Chinese Patent Application No. 201780037902.4.
Office Action dated Feb. 1, 2021, in Chinese Patent Application No. 201780037902.4.
Office Action dated Jan. 24, 2021, in Korean Patent Application No. Oct. 2018-7032280.

* cited by examiner

HYBRID CAPACITOR AND MANUFACTURING METHOD THEREOF

TECHNICAL FIELD

The present disclosure relates to a hybrid capacitor including a negative electrode that can occlude and release lithium ions and a positive electrode having an electrical double-layer capacitance and a manufacturing method thereof.

BACKGROUND ART

An electrical double-layer capacitor including a positive electrode and a negative electrode which mainly include activated carbon is charged and discharged when cations and anions in an electrolytic solution are adsorbed to or released from activated carbon. The electrical double-layer capacitor is able to be rapidly charged and discharged, and has excellent output characteristics and excellent cycle characteristics, but it has a low energy density. On the other hand, a lithium secondary battery in which a material that can occlude and release lithium ions is used as a positive electrode active material and a negative electrode active material is charged when lithium ions are moved from the positive electrode to the negative electrode and is discharged when lithium ions are moved from the negative electrode to the positive electrode. While lithium ion secondary batteries can operate at a high voltage and have a large energy density, rapid charging and discharging are difficult, and there is also a problem of the reliability of a charging and discharging cycle.

In recent years, a so-called hybrid capacitor utilizing advantages of both has been proposed. The hybrid capacitor includes a positive electrode including an active material having an electrical double-layer capacitance and a negative electrode including an active material that can occlude and release lithium ions, and has advantages of both the electrical double-layer capacitor and the lithium ion secondary battery. That is, the hybrid capacitor has a high energy density and excellent input and output characteristics.

In order for the hybrid capacitor to acquire stable cycle characteristics, it is necessary to prevent an operation potential of the negative electrode from being 1.0 V or less with respect to a potential (vs. Li/Li$^+$) at which an electrolytic solution is decomposed. Therefore, it is said that it is preferable to set a capacity of the negative electrode to be within a range of 1.05 to 1.3 times a capacity of the positive electrode (for example, refer to Patent Document 1). In addition, it is also proposed that it is preferable to set a capacity of the negative electrode to be within a range of 1.05 to 1.8 times a capacity of the positive electrode (for example, refer to Patent Document 2).

In addition, in order to reduce a direct current internal resistance, namely DCIR, it is proposed that, regarding a discharging capacity magnification of a negative electrode active material, a discharging capacity of 100% of lithium titanate as a negative electrode active material is 2.2 to 7.0 times a discharging capacity of 100% of activated carbon as a positive electrode active material (for example, refer to Patent Document 3). Here, when a discharging capacity magnification of the negative electrode active material is lowered, in other words, when a utilization ratio of the negative electrode active material, that is, a proportion of the negative electrode active material used during charging and discharging, increases, it is necessary for lithium ions to be diffused to deep parts of lithium titanate particles and a reactive surface area is reduced and a reaction resistance increases, and thus a DCIR increases. Conversely, when a discharging capacity magnification of the negative electrode active material increases, that is, when a utilization ratio of the negative electrode active material decreases, lithium ions are diffused near the surface of lithium titanate particles, and a reactive surface area increases, and thus a DCIR can be reduced. Therefore, a range in which a low DCIR is maintained is proposed.

CITATION LIST

Patent Literatures

Patent Document 1: JP 2002-270175 A
Patent Document 2: JP 2003-132945 A
Patent Document 3: WO2015/025764

SUMMARY OF INVENTION

Technical Problem

Keeping a utilization ratio of a negative electrode active material low is a problem in consideration of capacity increase and cost reduction for a capacitor. That is, since an amount of the negative electrode active material increases, the size of the negative electrode increases and a capacity per unit volume decreases. Therefore, in order to obtain a large capacity, the size of the capacitor increases, and in order to reduce the size of the capacitor, a low capacity is unavoidable. In addition, a large amount of a negative electrode active material is necessary, which results in high cost.

The present disclosure has been proposed in order to solve the above problems. An objective of the present invention is to provide a hybrid capacitor which increases a utilization ratio of a negative electrode active material and has a low direct current internal resistance, and a manufacturing method thereof.

Solution to Problem

Increasing a utilization ratio of a negative electrode active material means that lithium ions are diffused into deep parts of particles of the negative electrode active material and a diffusion distance of lithium ions increases. When a diffusion distance of lithium ions is longer, the direct current internal resistance increases. In addition, since a reactive surface area of the negative electrode active material decreases, the reaction resistance increases and the direct current internal resistance increases. Therefore, generally, the direct current internal resistance would increase according to an increase in the utilization ratio of the negative electrode active material. However, the inventors found that, when metal compound particles having a three-dimensional network structure are used as a negative electrode active material that can occlude and release lithium ions, surprisingly, even if the utilization ratio of the negative electrode active material increases, an increase in the direct current internal resistance is reduced.

Thus, a hybrid capacitor according to the present disclosure includes a positive electrode including a layer of a positive electrode active material having an electrical double-layer capacitance; and a negative electrode having a negative electrode active material layer including metal compound particles having a three-dimensional network structure which can occlude and release lithium ions and in which primary particles are bonded to each other with voids, wherein a discharging capacity of 100% of the metal compound particles having a three-dimensional network structure is 1.25 times or more and 5.0 times or less a discharging capacity of 100% of the positive electrode active material.

The metal compound particles may include less than 5 weight % carbon with respect to the metal compound particles. In addition, in a differential pore volume converted from a pore distribution obtained by analyzing the metal compound particles using a nitrogen gas adsorption measurement method, a differential pore volume in a pore size range of 10 to 40 nm may have a value of 0.01 cm$^3$/g or more.

The metal compound particles may be typically lithium titanate. The metal compound particles may have a three-dimensional network structure in which crystallites of lithium titanate are connected to each other, and a Magneli phase may be formed on a part of the surfaces of the crystallites. The positive electrode active material may be typically activated carbon. In metal compound particles, according to the manufacturing method, the metal compound particles may include less than 5 weight % the residual carbon.

In addition, a method for manufacturing hybrid capacitor according to the present disclosure includes a first process in which a precursor of metal compound particles and a carbon source are combined to obtain a first composite material; a second process in which the first composite material is heated under a non-oxidizing atmosphere to generate metal compound particles, and the metal compound particles and carbon are combined to obtain a second composite material; a third process in which the second composite material is heated under an oxygen atmosphere to obtain metal compound particles from which carbon is removed; a fourth process of preparing a negative electrode using the metal compound particles from which carbon is removed obtained in the third process as a negative electrode active material; and a fifth process of forming an element impregnated with an electrolytic solution in which a positive electrode and the negative electrode obtained in the fourth process face each other with a separator therebetween, wherein, in the fifth process, thicknesses of an active material layer in the positive electrode and an active material layer in the negative electrode are adjusted so that a discharging capacity of 100% of the metal compound particles having a three-dimensional network structure is 1.25 times or more and 5.0 times or less than a discharging capacity of 100% of the active material of the positive electrode.

Advantageous Effects of Invention

According to the present disclosure, it is possible to both increase a utilization ratio of the negative electrode active material and reduce an increase in the direct current internal resistance, and reduce a direct current internal resistance of the hybrid capacitor, increase a capacity, and reduce costs.

DESCRIPTION OF EMBODIMENTS

1. Configuration 1-1. Hybrid Capacitor

Figure 1:
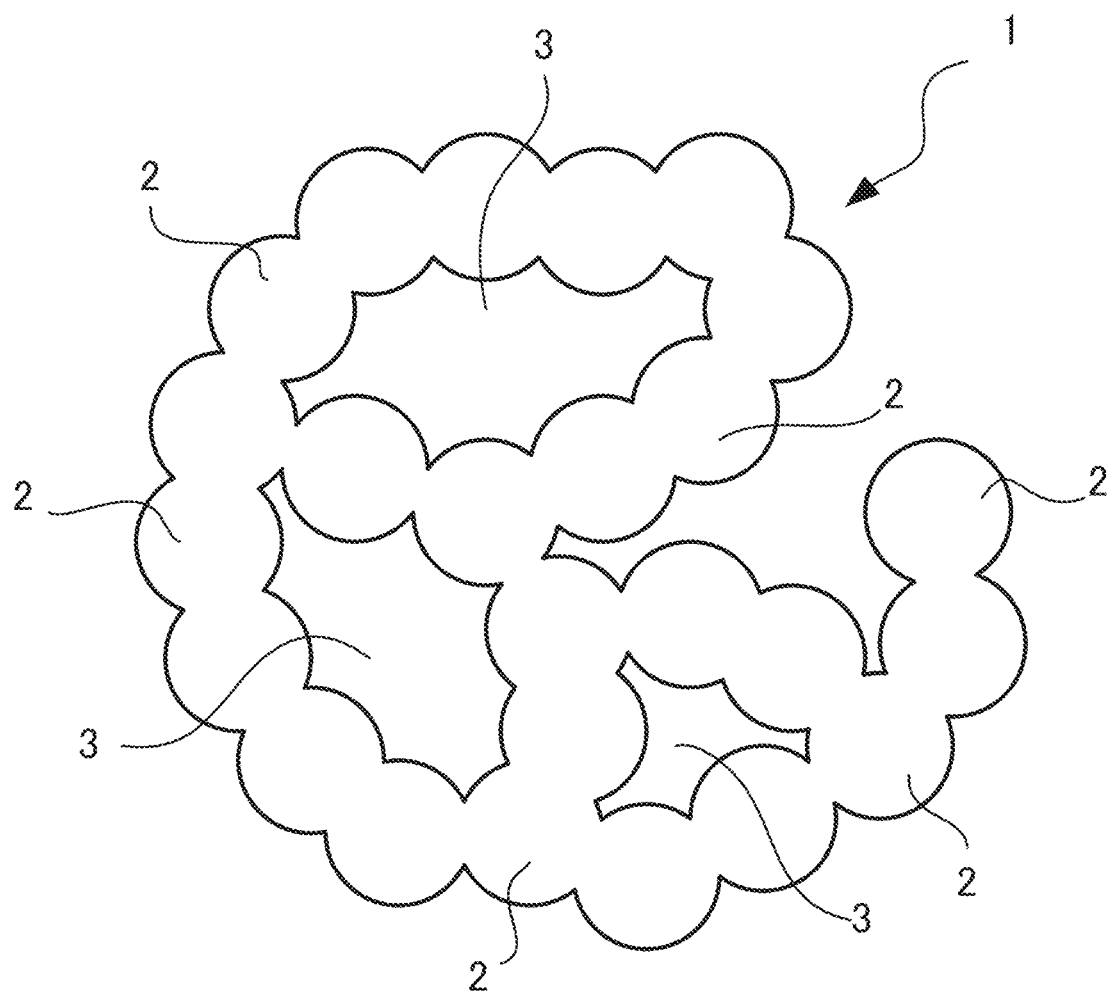
FIG. 1 is a conceptual diagram showing an example of a negative electrode active material of a hybrid capacitor according to the present embodiment.

Embodiments of the present disclosure will be described below. In a hybrid capacitor, a positive electrode is a polarizable electrode having an electrical double-layer capacitance, and a negative electrode is a Faraday reaction electrode that can occlude and release lithium ions. The positive electrode and the negative electrode face each other with a separator therebetween. The positive electrode, the negative electrode, and the separator constitute a capacitor element. An electrolytic solution is impregnated into the capacitor element.

The positive electrode is formed by supporting a positive electrode active material on a current collector. The negative electrode is formed by supporting a negative electrode active material on a current collector. The positive electrode active material is molded and bonded to the current collector. The negative electrode active material is molded and bonded to the current collector. The positive electrode active material and the current collector, and the negative electrode active material and the current collector are bonded respectively via a binder using pressure bonding, a doctor blade method, or the like.

The current collector is, typically, a conductive material such as aluminum, copper, iron, nickel, titanium, steel, and carbon. In particular, aluminum or copper having high thermal conductivity and electron conductivity is preferable. As the shape of the current collector, any shape such as a film shape, a foil shape, a plate shape, a net shape, an expanded metal shape, or a cylindrical shape can be used.

Examples of the binder include rubbers such as a fluorine type rubber, a diene type rubber, and a styrene type rubber, a fluorine-containing polymer such as polytetrafluoroethylene and polyvinylidene fluoride, celluloses such as carboxymethyl cellulose, and nitrocellulose, and additionally, a polyolefin resin, a polyimide resin, an acrylic resin, a nitrile resin, a polyester resin, a phenol resin, a polyvinyl acetate resin, a polyvinyl alcohol resin, and an epoxy resin. These binders may be used alone, or a mixture of two or more thereof may be used.

1-2. Positive Electrode

The positive electrode active material mainly includes a carbon material, and the carbon material has a porous structure or a fibrous structure, and has an electrical double-layer capacitance. The carbon material may be subjected to an opening treatment or an activation treatment. An appropriate amount of a conductive additive may be mixed into a layer of the positive electrode active material as necessary. The carbon material as the positive electrode active material is a single material selected from among the following materials or a mixture of a plurality of types thereof.

First, typical examples of the positive electrode active material having a porous structure include natural plant tissues such as coconut shell, synthetic resins such as phenol, activated carbon made from a source material derived from fossil fuels such as coal, coke, and pitch, carbon black such as Ketchen black, acetylene black, and channel black, carbon nanohorn, amorphous carbon, natural graphite, artificial graphite, graphitized Ketchen black, and mesoporous carbon. Typical examples of the positive electrode active material having a fibrous structure include carbon nanotubes and carbon nanofibers.

1-3. Negative Electrode

The negative electrode active material is metal compound particles that can occlude and release lithium ions. As shown in FIG. 1, the negative electrode active material has a three-dimensional network structure 1. In the three-dimensional network structure 1, nanosized primary particles 2 are connected to each other and continuous in a mesh form and nanosized voids 3 exist. There is no grain boundary at a binding interface of the primary particles 2, and on the other hand, there are many fine pores between the primary particles 2. In the negative electrode active material, the three-dimensional network structure 1 forms an electron path, the voids 3 become a storage space of an electrolytic solution, and pores between the primary particles 2 are considered to become a path of ions.

Examples of metal compound particles used as the negative electrode active material include oxides such as FeO, $Fe_2O_3$, $Fe_3O_4$, MnO, $MnO_2$, $Mn_2O_3$, $Mn_3O_4$, COO, $Co_3O_4$, NiO, $Ni_2O_3$, TiO, $TiO_2$, $TiO_2(B)$, CuO, NiO, SnO, $SnO_2$, $SiO_2$, $RuO_2$, WO, $WO_2$, $WO_3$, $MoO_3$, and ZnO, metals such as Sn, Si, Al, and Zn, composite oxides such as $LiVO_2$, $Li_3VO_4$, $Li_4Ti_5O_{12}$, $Sc_2TiO_5$, and $Fe_2TiO_5$, nitrides such as $Li_{2.6}Co_{0.4}N$, $Ge_3N_4$, $Zn_3N_2$, and $Cu_3N$, $Y_2Ti_2O_5S_2$, and $MoS_2$. Among these, lithium titanate ($Li_4Ti_5O_{12}$) is preferable.

The porosity in a cross section of the three-dimensional network structure is preferably in a range of 7 to 50%. When the porosity is less than 7%, an area in contact with an electrolytic solution is small, which influences the movement of ions in an electrolytic solution. In addition, when the porosity exceeds 50%, bonds between primary particles become sparse, and it is difficult to form a three-dimensional network structure.

An average particle size of primary particles is in a range of 5 to 300 nm. A method of calculating an average particle size is as follows. That is, the primary particles 2 are observed using a scanning electron microscope, an image including at least 150 primary particles or more is captured, a major diameter and a short diameter of an elliptical image of the primary particles 2 included in the captured single field of view (image) are measured, an average value of the major diameter and the minor diameter is calculated for each of the primary particles 2, average values of the primary particles 2 are summed, and the sum value is divided by the number of measured primary particles 2. The result falls within a range of 5 to 300 nm.

When primary particles in this range are bonded to form a three-dimensional network structure, metal compound particles acquire many nanosized pores, an area of metal compound particles in contact with an electrolytic solution increases, and the movement of ions in an electrolytic solution becomes smooth. In addition, when pores of the metal compound particles are measured, there are many fine pores. In particular, many fine pores of 40 nm or less are included.

In a differential pore volume converted from a pore distribution obtained by analyzing metal compound particles having a three-dimensional network structure using a nitrogen gas adsorption measurement method, a differential pore volume in a pore size range of 10 to 40 nm has a value of 0.01 $cm^3/g$ or more and particularly has a value of 0.02 $cm^3/g$ or more, and an area in contact with the electrolytic solution is high. When an area in contact with the electrolytic solution is larger, a discharging rate characteristic when used for a negative electrode is improved.

In metal compound particles having this three-dimensional network structure, according to a manufacturing method to be described below, adhered carbon remains. An amount of adhered carbon is preferably less than 5 weight % with respect to the metal compound particles. Within this range, a decrease in the energy density due to the presence of carbon can be reduced. In particular, an amount of adhered carbon is preferably less than 1 weight % with respect to the metal compound particles. When an amount of carbon is limited to a very small amount, a reaction between carbon and an electrolytic solution in the negative electrode is restricted and storage characteristics are improved.

Figure 2:
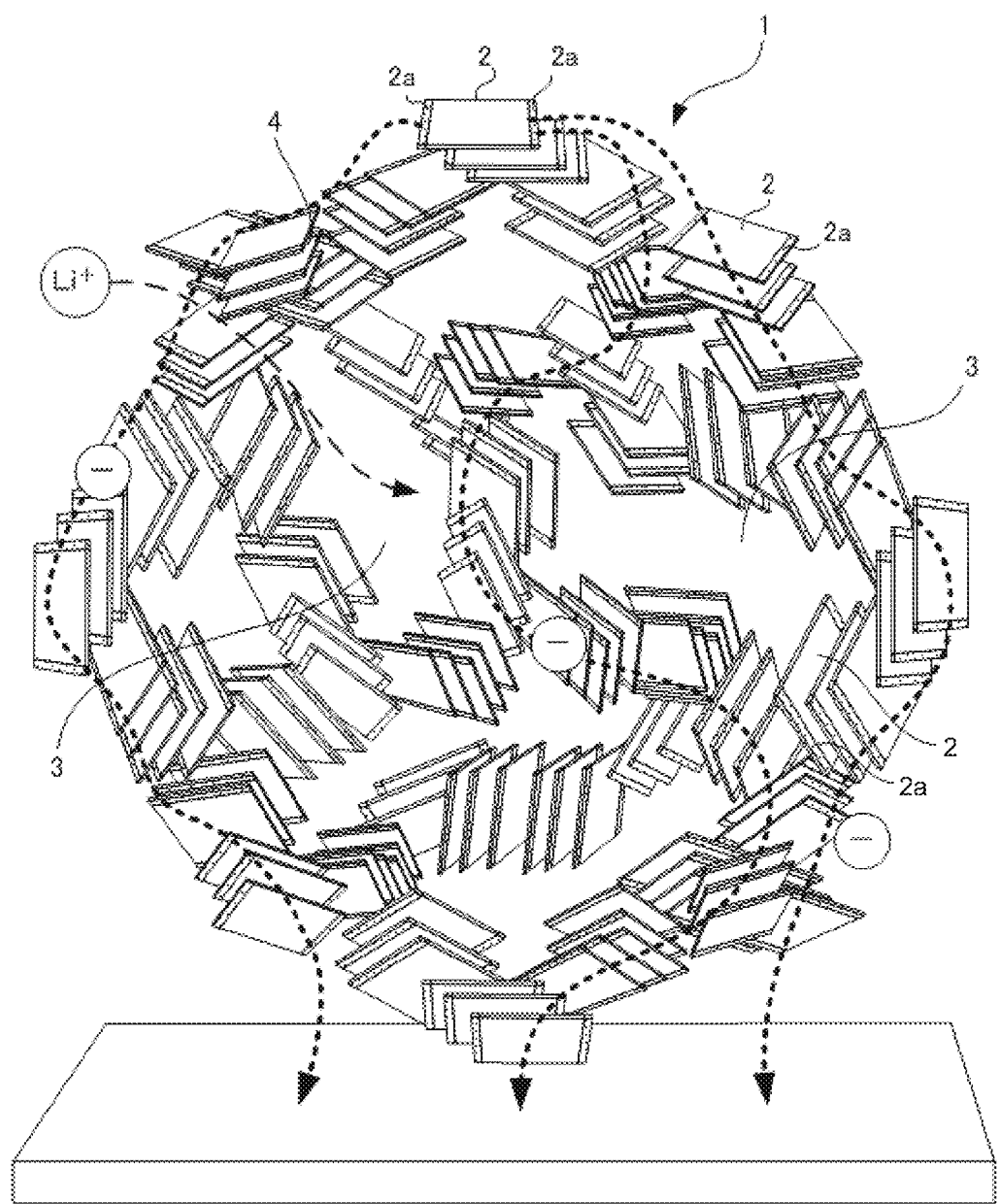
FIG. 2 is a conceptual diagram showing another example of the negative electrode active material of the hybrid capacitor according to the present embodiment.

Here, when metal compound particles serving as a negative electrode active material are lithium titanate, as shown in FIG. 2, the primary particles 2 of the metal compound particles are more preferably crystallites of which a part of the surface has a Magneli phase 2a. A crystallite is the largest aggregation that can be regarded as a single crystal of a metal compound. Crystallites are randomly oriented and bonded to each other on surfaces such as a flat surface and an end surface, and have pores 4 in some places. When a crystallite has a flat plate shape, a three-dimensional network structure is a card house structure. When a crystallite is a flat plate or a polyhedron, the surface of the crystallite is an edge surface and an edge or an end of a faceted surface. In addition, when a crystallite has a shape formed as a curved surface, the surface of the crystallite is a single or a plurality of partial regions thereof.

The crystallite has a flat plate shape such as a triangle, a rectangle or other polygonal shapes, a polyhedron shape with a thickness, or a shape formed in a sphere, an ellipsoid, or other curved surface. As metal compound particles constituting a three-dimensional network structure by crystallites having a Magneli phase, a spinel type lithium titanate represented by $Li_{4+w}Ti_5O_{12}$ (0≤w≤3) or a Ramsdellite type lithium titanate represented by $Li_{2+y}Ti_3O_7$ (0≤y≤3) can be used.

A Magneli phase is generated when one or more of edges or ends of crystallites are altered or when a part of the full length of edges or ends of crystallites or the full length thereof is altered. A Magneli phase may be included not only in edges or ends, but also in a partial region on the center part of the faceted surface. A Magneli phase may be a titanium oxide represented by a general formula $Ti_nO_{2n-1}$ (3≤n≤10). The Magneli phase 2a is, for example, $Ti_4O_7$, a mixed phase of $Ti_4O_7$ and $Ti_5O_9$, or any single substance selected from among compounds represented by a general formula $Ti_nO_{2m-1}$ (3≤n≤10) or a mixed phase of two or more thereof.

The negative electrode active material formed of lithium titanate has both characteristics of lithium titanate and characteristics of a Magneli phase. Lithium titanate has an energy storage function according to insertion and release of lithium ions. Since a change in the volume due to this insertion and release is about 1%, capacity deterioration is low. Since a charging and discharging potential is about 1.55 V (vs. Li/Li$^+$), side reactions such as decomposition of an electrolytic solution and precipitation of the metal lithium due to rapid charging and discharging are unlikely to occur, and cycle characteristics are excellent. The Magneli phase has high electrical conductivity, and $Ti_4O_7$ has an electrical conductivity of about 2.75 times that of carbon. That is, the negative electrode active material has a characteristic that high electrical conductivity is additionally imparted by a Magneli phase, while the performance of the active material as lithium titanate is maintained.

In addition, the negative electrode active material has a three-dimensional network structure in which a Magneli phase with high electrical conductivity is present on the surface of crystallites, and the crystallites are connected on surfaces such as a flat surface and an end surface. Therefore, the crystallites are partially connected via Magneli phases. Connection forms include a case in which Magneli phases are connected to each other, a case in which a Magneli phase and a surface other than a Magneli phase are connected to each other, and a combination of thereof. Accordingly, in the negative electrode active material, an electron path including a Magneli phase is formed, and the entire negative electrode active material also has high electrical conductivity.

1-4. Utilization Ratio of Negative Electrode Active Material

Amounts of the negative electrode active material in the negative electrode and a positive electrode active material in the positive electrode are adjusted so that a discharging capacity of 100% of the negative electrode active material is 1.25 times or more and 5.0 times or less a discharging capacity of 100% of the positive electrode active material. In other words, a utilization ratio of the negative electrode active material is adjusted to be within a range of 20% or more and 80% or less. In this range, when metal compound particles having a three-dimensional network structure are used as a negative electrode active material, even if a utilization ratio of the negative electrode active material increases, the direct current internal resistance is unlikely to increase and the direct current internal resistance tends to be kept low.

If a discharging capacity magnification exceeds 5.0 (utilization ratio is less than 20%), and when metal compound particles having a three-dimensional network structure are used as a negative electrode active material, this is not preferable because a direct current internal resistance is high and a capacity per volume of a hybrid capacitor becomes small. On the other hand, when a discharging capacity magnification is less than 1.25 (utilization ratio exceeds 80%), and when metal compound particles having a three-dimensional network structure are used as a negative electrode active material, this is not preferable because a further decrease in the direct current internal resistance and an increase in the discharging capacity cannot be expected and a plateau region in the charging and discharging curve of the hybrid capacitor is left.

For the discharging capacity magnification, more preferably, amounts of the negative electrode active material in the negative electrode and a positive electrode active material in the positive electrode are adjusted so that a discharging capacity of 100% of the negative electrode active material is 1.25 times or more and 2.5 times or less than a discharging capacity of 100% of the positive electrode active material. In other words, a utilization ratio of the negative electrode active material is preferably adjusted to be within a range of 40% or more and 80% or less. Compared to the case in which a discharging capacity magnification is more than 2.5 times and 5.0 times or less, that is, a utilization ratio is in a range of 20% or more and less than 40%, the direct current internal resistance is low and characteristics are beneficial.

In addition, when a utilization ratio of the negative electrode active material increases, a proportion (weight or volume) of the negative electrode active material in the capacitor element can be reduced, the size of the hybrid capacitor can be reduced, and an amount of the negative electrode active material used is reduced, which results in cost reduction.

As a method of adjusting amounts of the positive electrode active material and the negative electrode active material, a discharging capacity of 100% per unit mass of the negative electrode active material layer including metal compound particles having a three-dimensional network structure and a discharging capacity of 100% per unit mass of the positive electrode active material layer are measured, and masses of a layer of metal compound particles having a three-dimensional network structure and a layer of the positive electrode active material may be adjusted so that a discharging capacity of 100% of the negative electrode active material layer including metal compound particles having a three-dimensional network structure is 1.25 times or more and 5.0 times or less a discharging capacity of 100% of the positive electrode active material layer. When the densities of the negative electrode active material and the positive electrode active material supported by the current collector are constant, the thicknesses of the negative electrode active material layer and the positive electrode active material layer may be adjusted.

A discharging capacity of 100% of the negative electrode active material and a discharging capacity of 100% of the positive electrode active material are values obtained by the following method. That is, a half cell is formed by combining a working electrode including a negative electrode active material layer and a lithium counter electrode and is charged and discharged at a rate of 1 C in a range of 3 V to 1 V with respect to Li/Li$^+$, and a discharging capacity is measured. Then, the measurement value is converted into a discharging capacity per 1 g of the negative electrode active material layer. When a conductive additive such as carbon, a binder, and the like are added to metal compound particles having a three-dimensional network structure, the measurement value is divided by a total weight of the negative electrode active material layer including the metal compound particles and the additive. In metal compound particles, according to the manufacturing method, less than 5% by weight of carbon with respect to the metal compound particles remains and is contained. When carbon remains in metal compound particles, the calculated value is divided by a total weight of the negative electrode active material layer including the metal compound particles containing the residual carbon and the additive.

In addition, a half cell is formed by combining a working electrode including a positive electrode active material layer and a lithium counter electrode and is charged and discharged at a rate of 1 C in a range of 4.3 V to 3 V with respect to $Li/Li^+$, and a discharging capacity is measured. Then, the measurement value is converted into a discharging capacity per 1 g of the positive electrode active material layer. When a conductive additive such as carbon, a binder, and the like are added to the positive electrode active material, the measurement value is divided by a total weight of the positive electrode active material layer including the positive electrode active material and the additive.

A utilization ratio of the negative electrode active material is represented as a percentage of a reciprocal number of a discharging capacity magnification according to a numerical value.

1-5. Separator

As the separator serving as a base material, celluloses such as Kraft cellulose, Manila hemp, esparto, hemp, and rayon and mixed paper thereof, a polyester resin such as polyethylene terephthalate, polybutylene terephthalate, polyethylene naphthalate, and derivatives thereof, a polytetrafluoroethylene resin, a polyvinylidene fluoride resin, a vinylon resin, and a polyamide resin such as aliphatic polyamides, semi-aromatic polyamides, and wholly aromatic polyamides, and resins such as a polyimide resin, a polyethylene resin, a polypropylene resin, a trimethylpentene resin, a polyphenylene sulfide resin, and an acrylic resin can be used alone or a mixture thereof can be used.

1-6. Electrolytic Solution

The electrolyte of the electrolytic solution is a lithium salt serving as a lithium ion source. Examples of the lithium salt include $LiPF_6$, $LiBF_4$, $LiClO_4$, $LiN(SO_2CF_3)_2$, $LiN(SO_2C_2F_5)_2$, $CF_3SO_3Li$, $LiC(SO_2CF_3)_3$, and $LiPF_3(C_2F_5)_3$, and a mixture thereof.

As an electrolyte, a quaternary ammonium salt may be added in addition to the lithium salt. As the quaternary ammonium salt, tetraethylammonium, triethylmethylammonium, diethyldimethylammonium, ethyltrimethylammonium, methyl ethyl pyrrolidinium, spirobipyrrolidinium, spiro-(N,N')-bipyrrolidinium, 1-ethyl-3-methylimidazolium, 1-ethyl-2,3-dimethylimidazolium, and the like may be exemplified as cations, and $BF_4^-$, $PF_6^-$, $ClO_4^-$, $AsF_6^-$, $SbF_6^-$, $AlCl_4^-$, and $RfSO_3^-$, $(RfSO_2)_2N^-$, $RfCO_2^-$ (Rf is a fluoroalkyl group having 1 to 8 carbon atoms), and the like may be exemplified as anions.

As the solvent of the electrolytic solution, the following solvents may be used. Here, these solvents may be used alone or a mixture of two or more thereof may be used. For example, a cyclic carbonate ester, a chain carbonate ester, a phosphate ester, a cyclic ether, a chain ether, a lactone compound, a chain ester, a nitrile compound, an amide compound, a sulfone compound, and the like may be exemplified. Examples of the cyclic carbonate ester include ethylene carbonate, propylene carbonate, butylene carbonate, 4-fluoro-1,3-dioxolan-2-one, and 4-(trifluoromethyl)-1,3-dioxolan-2-one. Ethylene carbonate and propylene carbonate are preferable.

Examples of the chain carbonate ester include dimethyl carbonate, ethyl methyl carbonate, diethyl carbonate, methyl n-propyl carbonate, methyl isopropyl carbonate, n-butyl methyl carbonate, ethyl n-propyl carbonate, ethyl isopropyl carbonate, n-butyl ethyl carbonate, di n-propyl carbonate, diisopropyl carbonate, di-n-butyl carbonate, fluoroethyl methyl carbonate, difluoroethyl methyl carbonate, and trifluoroethyl methyl carbonate. Dimethyl carbonate, ethyl methyl carbonate, and diethyl carbonate are preferable.

Examples of the phosphate ester include trimethyl phosphate, triethyl phosphate, ethyl dimethyl phosphate, and diethyl methyl phosphate. Examples of the cyclic ether include tetrahydrofuran, and 2-methyltetrahydrofuran. Examples of the chain ether include dimethoxyethane. Examples of the lactone compound include γ-valerolactone, and γ-butyrolactone. Examples of the chain ester include methyl propionate, methyl acetate, ethyl acetate, and methyl formate. Examples of the nitrile compound include acetonitrile. Examples of the amide compound include dimethylformamide. Examples of the sulfone compound include sulfolane, methyl sulfolane, dimethyl sulfone, ethyl methyl sulfone, and isopropyl sulfone, but the present disclosure is not limited thereto.

2. Actions and Effects

When metal compound particles having a three-dimensional network structure in which primary particles are bonded to each other with voids are used as a negative electrode active material of the hybrid capacitor, even if a utilization ratio of the negative electrode active material increases, it is difficult to also increase a direct current internal resistance. That is, in a complex of solid metal compound particles and carbon of the related art except for pores, a utilization ratio of the negative electrode active material and a direct current internal resistance are contrary to each other, but they can coexist in a hybrid capacitor in which metal compound particles having a three-dimensional network structure ae used as a negative electrode active material, and even if a utilization ratio increases, an increase in the direct current internal resistance is reduced. In addition, it is effective in consideration of a discharging capacity.

Therefore, when the hybrid capacitor includes a positive electrode including a layer of a positive electrode active material having an electrical double-layer capacitance and a negative electrode which can occlude and release lithium ions and including a negative electrode active material layer containing metal compound particles having a three-dimensional network structure in which primary particles are bonded to each other with voids, even if a utilization ratio of the negative electrode active material increases, it is possible to reduce the size, increase the capacity, and reduce costs, and also reduce the direct current internal resistance, improve power storage efficiency, and lengthen the lifespan.

In addition, the negative electrode active material has a three-dimensional network structure in which crystallites of lithium titanate are connected to each other, and a Magneli phase is formed on a part of the surfaces of the crystallites. When a highly conductive Magneli phase forms a part of an electron path, the conductivity of the negative electrode active material is further improved, and additionally, an excellent discharging rate characteristic is exhibited, and the conductive additive is not necessary or included in a very small amount. Therefore, it is possible to further improve a capacity per volume of the negative electrode active material.

3. Manufacturing Method of Negative Electrode Active Material

3-1. Overview

A method of manufacturing a negative electrode active material having a three-dimensional network structure will be described. The method of manufacturing a negative electrode active material is not limited to the following method, but it can be manufactured through the following three processes. That is, the first process is a process in which a precursor of metal compound particles and a carbon source are combined to obtain a first composite material. The second process is a process in which the first composite material is heated under a non-oxidizing atmosphere to generate metal compound particles, and the metal compound particles are combined with carbon to obtain a second composite material. The third process is a process in which the second composite material is heated under an oxygen atmosphere to remove carbon and metal compound particles are obtained.

3-2. First Process

A precursor of metal compound particles and a carbon source are combined to obtain a first composite material. The precursor of the metal compound particles refers to a material before metal compound particles are generated according to a heat treatment process. For example, a metal compound containing any one or more of Mn, Co, Ni, V, Fe, Ti, Sn, Si, Ru, W, Zn, Al, Ge, Cu, Mo, Zn, Sc, Y, S and N may be used. A precursor containing a lithium source added to this constituent compound is used.

A material source of metal compound particles may be a powder or may be dissolved in a solution. In the case of lithium titanate, for example, a titanium source such as titanium alkoxide and titanium oxide, or a lithium source such as lithium acetate, lithium nitrate, lithium carbonate, and lithium hydroxide may be used as a material source, and a precursor of metal compound particles is generated.

The carbon source is carbon itself or a material that can be converted into carbon according to a heat treatment. Carbon itself is, for example, a powder, and any type can be used without particular limitation as long as it is a carbon material having conductivity. For example, carbon black such as Ketchen black, acetylene black, and Channel Black, fullerene, carbon nanotubes, carbon nanofibers, amorphous carbon, carbon fibers, natural graphite, artificial graphite, graphitized Ketchen black, mesoporous carbon, vapor-grown carbon fibers, and the like may be exemplified. Among these, a carbon material having a nano particle size is preferable.

A material that can be converted into carbon according to a heat treatment is an organic substance which is deposited on the surface of the precursor of metal compound particles and is converted into carbon in a later heat treatment process. Examples of the organic substance include polyhydric alcohol (ethylene glycol, etc), polymers (polyvinyl alcohol, polyethylene glycol, polyvinylpyrrolidone, etc), sugars (glucose, etc.), and amino acids (glutamic acid, etc.)

Examples of a method of combining a material source of metal compound particles with a carbon source include a mechanochemical treatment, a spray drying treatment, and a stirring treatment. In any method of combination, at least one type of material source of metal compound particles and a carbon source are added to a solvent, and the material source is dissolved in the solvent to obtain a solution. As the solvent, water, methanol, ethanol, or isopropyl alcohol can be suitably used. A mixture of two or more types of solvent may be used. If a precursor reaction of metal compound particles is a hydrolysis reaction, a material source thereof may be a metal alkoxide M(OR)x.

In the mechanochemical treatment, shear stress and a centrifugal force are applied to the solution and the precursor of metal compound particles are bonded to the surface of carbon powder. In this treatment, shear stress and a centrifugal force are applied to the solution in a reaction chamber that turns. As the reaction chamber, a reaction chamber which is composed of concentric cylinders including an outer cylinder and an inner cylinder and in which a through-hole is provided on a side surface of the turnable inner cylinder, and a sheathing board is disposed on an opening of the outer cylinder is suitably used. In the reaction chamber, a distance between the outer wall surface of the inner cylinder and the inner wall surface of the outer cylinder is preferably 5 mm or less and more preferably 2.5 mm or less. Here, a centrifugal force necessary for forming the thin film is 1,500 N (kgms$^{-2}$) or more and preferably 70,000 N or more (kgms$^{-2}$).

In the spray drying treatment, a carbon powder is dispersed in the solvent, and a material source of metal compound particles may then be dispersed. As a dispersion method, a carbon powder may be highly dispersed in the solvent using an ultracentrifugation treatment (a treatment in which shear stress and a centrifugal force are applied to a powder in the solution), a bead mill, a homogenizer, or the like. The spray drying treatment is performed at a pressure of about 0.1 Mpa and a temperature at which carbon powder does not burn. According to the spray drying treatment, a precursor of metal compound particles having an average particle size of primary particles in a range of 5 to 300 nm is obtained. Here, in the stirring treatment, since the polymer can efficiently cover the surface of the material source of metal compound particles, excess growth of metal compound particles in the following second process is suppressed and nanosized microparticles are easily generated.

In the stirring treatment, a powder serving as a material source is preferably nano-level microparticles that have previously been pulverized. When a polymer is used as a material that can be converted into carbon according to a heat treatment, a material source of metal compound particles is added to a solvent to which a polymer is added in advance, and this solution may be stirred. When the weight of the powder serving as a material source of metal compound particles is set as 1, the polymer weight may be adjusted to be within a range of 0.05 to 5. In addition, when an average secondary particle size of microparticles is set to 500 nm or less, and preferably, 100 nm or less, it is possible to obtain metal compound particles having a small particle size.

3-3. Second Process

In the process of obtaining a second composite material, the first composite material is heated under a non-oxidizing atmosphere to generate metal compound particles, and a second composite material in which the metal compound particles and carbon are combined is obtained. The non-oxidizing atmosphere is set to prevent burning of the carbon source, and examples of the non-oxidizing atmosphere include an inert atmosphere and a saturated steam atmosphere. Typically, the non-oxidizing atmosphere is a vacuum, or a nitrogen or argon atmosphere.

According to this heat treatment, while the precursor of metal compound particles grows, and is combined with a carbon source, metal compound particles are generated. When a material that can be converted into carbon according to a heat treatment is used as a carbon source, according to a heat treatment under a non-oxidizing atmosphere, the material is carbonized on the surface of the precursor of metal compound particles, carbon is generated, and a second composite material in which the carbon is combined with metal compound particles that grow according to a heat treatment is generated.

In addition, since a heat treatment is performed under a non-oxidizing atmosphere, the carbon source is unlikely to burn, and exists in a state in which it is combined with metal compound particles, and a second composite material in which metal compound particles and carbon are combined is obtained. The second composite material is considered as a composite material in which metal compound particles (for example, lithium titanate: LTO) are supported on carbon (for example, carbon nanofibers: CNF) and LTO is dispersed as nanosized particles on CNF.

When a heat treatment is performed under an inert atmosphere, in order to prevent burning of the carbon source, a temperature thereof is maintained in a range of 600 to 950° C. for 1 minute to 20 minutes. Within this range, favorable metal compound particles are obtained and a favorable capacity and rate characteristics are obtained. In particular, when metal compound particles are lithium titanate, if a heat treatment temperature is lower than 600° C., this is not preferable because insufficient lithium titanate is generated, and when a heat treatment temperature exceeds 950° C., this is not preferable because lithium titanate aggregates and lithium titanate itself decomposes. Under a nitrogen atmosphere, nitrogen is doped into metal compound particles, and the conductivity of metal compound particles increases. Here, when the following preheat treatment is not performed, the temperature may be maintained in the same temperature range for 3 to 7 hours.

In addition, when a heat treatment is performed under a saturated steam atmosphere as a heat treatment under a non-oxidizing atmosphere, in order to prevent burning of the carbon source, a temperature thereof is maintained in a range of 110 to 300° C. for 1 to 8 hours.

Here, before the process of obtaining a second composite material, the first composite material may be subjected to a preheat treatment in a temperature range of 200 to 500° C. for 1 to 300 minutes. This preheat treatment is desirably performed under a non-oxidizing atmosphere, but it may be performed under an oxygen atmosphere when the temperature is lower than 300° C. at which the carbon source does not burn. According to metal compound particles obtained by this preheat treatment, it is possible to remove impurities present in the first composite material, and a state in which the precursor of metal compound particles is uniformly attached to the carbon source can be obtained. In addition, an effect of promoting generation of the precursor of metal compound particles included in the first composite material is obtained.

3-4. Third Process

In the process of obtaining metal compound particles, the second composite material is heated under an oxygen atmosphere, carbon is burned, and voids are generated in carbon portions. In addition, according to this heat treatment, metal compound particles react with and bond to each other. Accordingly, carbon-derived voids and bonds between metal compound particles are combined and metal compound particles have a three-dimensional network structure.

In order to remove carbon and bond metal compound particles to each other, a heat treatment temperature is preferably maintained in a range of 350 or higher and 800° C. or lower, preferably 400 or higher and 600° C. or lower for 1 to 24 hours. In particular, under an inert atmosphere, a temperature is preferably set to be lower than the heat treatment temperature in the process of obtaining a second composite material. At a temperature of lower than 350° C., carbon contained in the second composite material is insufficiently removed, and at a temperature of higher than 800° C., aggregation of primary particles proceeds and there are fewer voids. In addition, in a temperature range of 400 or higher and 600° C. or lower, an average particle size of primary particles is maintained at 5 to 300 nm, and particle growth from the average particle size of primary particles of the metal compound particles before the heat treatment is suppressed.

In addition, the heat treatment temperature is preferably equal to or higher than a temperature of a preheating process. As the oxygen atmosphere, an atmosphere mixed with nitrogen or the like may be used, and an atmosphere containing 15% or more oxygen, such as in the atmosphere is preferable. In the heat treatment under an oxygen atmosphere, since an amount of oxygen decreases due to loss of carbon, oxygen may be appropriately supplied into a heat treatment furnace.

Thus, it is thought that the negative electrode active material having a three-dimensional network structure is generated when carbon in a complex is burned and crystallites are sintered. When metal compound particles are lithium titanate, furthermore, it is thought that, according to a heat treatment of a complex under an oxygen atmosphere, the surface of crystallites of lithium titanate is transformed to a Magneli phase. Therefore, a combining ratio based on masses of carbon and crystallites, an oxygen concentration, a burning temperature and a burning time may determine the size of lithium titanate particles, a degree of carbon removal, the presence or absence of transformation to a Magneli phase and a transformation proportion. For example, at a temperature of 300° C. or higher and lower than 400° C., transformation to a Magneli phase is unlikely to proceed, and the presence or absence and a proportion of a Magneli phase can be controlled by adjusting the temperature.

EXAMPLES

The present invention will be described below in further detail with reference to examples. Here, the present invention is not limited to the following examples.

4. Example 1

4-1. Negative Electrode Active Material

The following three processes were performed and a negative electrode active material having a three-dimensional network structure was generated. First, 20 g of carbon nanofibers and 245 g of tetraisopropoxy titanium were added to 1,300 g of isopropyl alcohol. A weight ratio between titanium alkoxide and carbon nanofibers was selected so that a weight ratio between lithium titanate and carbon nanofibers after the first process was about 8:2.

The obtained liquid was introduced into an inner cylinder of a reaction chamber which was composed of concentric cylinders including an outer cylinder and an inner cylinder and in which a through-hole was provided on a side surface of the inner cylinder, and a sheathing board was disposed on an opening of the outer cylinder. The inner cylinder was turned for 300 seconds so that a centrifugal force of 35,000 kgms$^{-2}$ was applied to the liquid, and carbon nanofibers were highly dispersed in the liquid.

In addition, 165 g of acetic acid and 50 g of lithium acetate were dissolved in a mixed solvent containing 145 g of isopropyl alcohol and 150 g of water. The obtained liquid was introduced into the inner cylinder of the reaction chamber to prepare a solution. The inner cylinder was turned for 300 seconds so that a centrifugal force of 35,000 kgms$^{-2}$ was applied to this solution, a thin film of the solution was formed on the inner wall of the outer cylinder, and shear stress and a centrifugal force were applied to the solution.

Subsequently, the content in the reaction chamber was collected, the solvent was evaporated in air, and additionally dried at 100° C. for 17 hours. The resultant product obtained by drying was subjected to a preheat treatment in a nitrogen atmosphere at 400° C. for 30 minutes, and a heat treatment was then performed in a nitrogen atmosphere at 900° C. for 3 minutes. In addition, 100 g of the resultant product obtained according to a heat treatment in a nitrogen atmosphere was subjected to a heat treatment in an oxygen atmosphere at 500° C. for 6 hours, and a final resultant product as a negative electrode active material having a three-dimensional network structure was obtained.

4-2. Hybrid Capacitor

Activated carbon, carbon black, and an acrylic binder were mixed at a weight ratio of 10:1:1, and an appropriate amount of N-methyl pyrrolidone was additionally mixed with the mixture to obtain a slurry. The obtained slurry was applied to a current collector which was made of aluminum and had a conductive adhesive layer containing graphite, a positive electrode active material layer with a predetermined thickness was formed, and a positive electrode was produced. Similarly, the obtained negative electrode active material having a three-dimensional network structure and polyvinylidene fluoride were mixed at a weight ratio of 10:1, and an appropriate amount of N-methyl pyrrolidone was additionally mixed with the mixture to obtain a slurry. The obtained slurry containing the negative electrode active material having a three-dimensional network structure was applied to a current collector made of aluminum, a negative electrode active material layer with a predetermined thickness was formed, and a negative electrode was produced. Then, a capacitor element in which a positive electrode and a negative electrode facing each other with a rayon separator therebetween was formed. The size of the capacitor element was 3 cm×4 cm.

For an electrolytic solution, 1.2 mol of LiBF$_4$ as an electrolyte was added to 1 L of a propylene carbonate (PC) solvent, and a 1.2 M-LiBF$_4$/PC electrolytic solution was prepared. This electrolytic solution was impregnated into a capacitor element, lamination and sealing were performed, a laminated type hybrid capacitor cell was produced, and an aging treatment was performed. Negative electrode active materials with various layer thicknesses were prepared with reference to a layer thickness of the positive electrode active material layer, and hybrid capacitors with a plurality of types of utilization ratio were produced.

When the positive electrode was produced, the layer thickness of the positive electrode active material was 100 µm. On the other hand, the thickness of the negative electrode was adjusted to a value so that a utilization ratio of the negative electrode active material was changed from 10% to 100% in 10% increments. First, a discharging capacity of 100% was measured for a positive electrode having a layer thickness of a positive electrode active material of 100 µm. Next, the layer thickness of the negative electrode active material was adjusted so that a discharging capacity of 100% matched a measurement value of the positive electrode. As a result, the negative electrode active material layer was 9.6 µm.

That is, when the negative electrode active material layer had a layer thickness of 9.6 µm, the utilization ratio was 100%. The thickness of the negative electrode active material layer corresponding to each utilization ratio was converted based on this layer thickness, and hybrid capacitors with various layer thicknesses and with utilization ratios were prepared according to the converted value. For example, the negative electrode active material with a layer thickness of 19.2 µm which is twice the layer thickness of 9.6 µm, had a utilization ratio of 50%. The thickness and the utilization ratio of the negative electrode active material layer are as shown in the following Table 1.

TABLE 1

| | Utilization ratio/% | | | | | | | | | | |
|---|---|---|---|---|---|---|---|---|---|---|---|
| | 0 | 10 | 20 | 30 | 40 | 50 | 60 | 70 | 80 | 90 | 100 |
| Positive electrode thickness/µm | 100 | 100 | 100 | 100 | 100 | 100 | 100 | 100 | 100 | 100 | 100 |
| Negative electrode thickness/µm | | 96 | 48 | 32 | 24 | 19.2 | 16 | 13.7 | 12 | 10.7 | 9.6 |

4-3. Comparative Example 1

A hybrid capacitor disclosed in Patent Document 3 was produced and subjected to an aging treatment. That is, activated carbon was used as a positive electrode active material, and activated carbon was bonded to an aluminum foil including a conductive adhesive layer containing graphite. In addition, 5 g of lithium titanate, 4.29 g of a binder composition containing a modified acrylonitrile resin, and 13 g of N-methyl pyrrolidone were mixed using a thin film swing type mixer to obtain slurry. The obtained slurry was applied to the aluminum foil at a predetermined thickness and dried.

The positive electrode and the negative electrode were stacked with a rayon separator therebetween and a propylene carbonate electrolytic solution containing 1.2 M-LiBF$_4$ was impregnated, lamination and sealing were performed, hybrid capacitors with various utilization ratios were obtained, and an aging treatment was performed.

4-4. Confirmation of Negative Electrode Active Material

Figure 3:
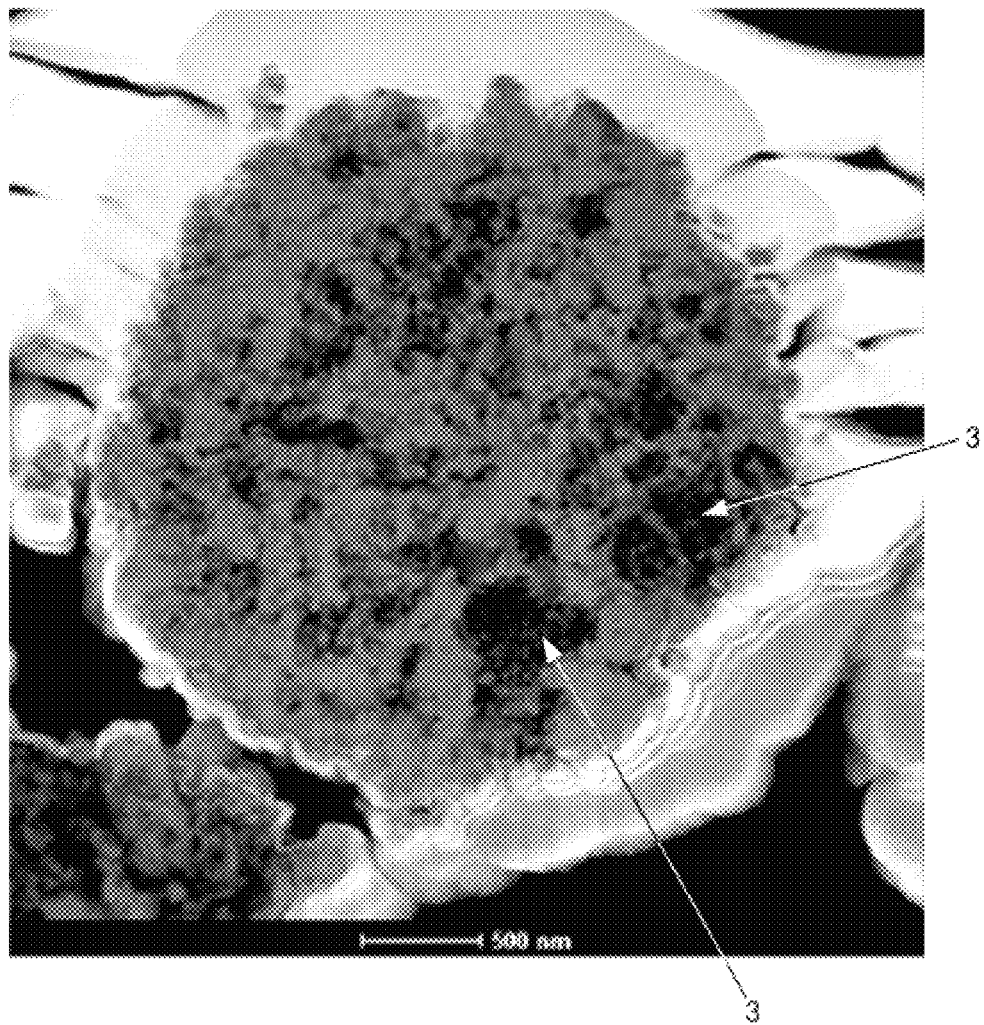
FIG. 3 is a TEM image obtained by capturing a cross section of metal compound particles of Example 1 with a magnification of 10,000.
Figure 4:
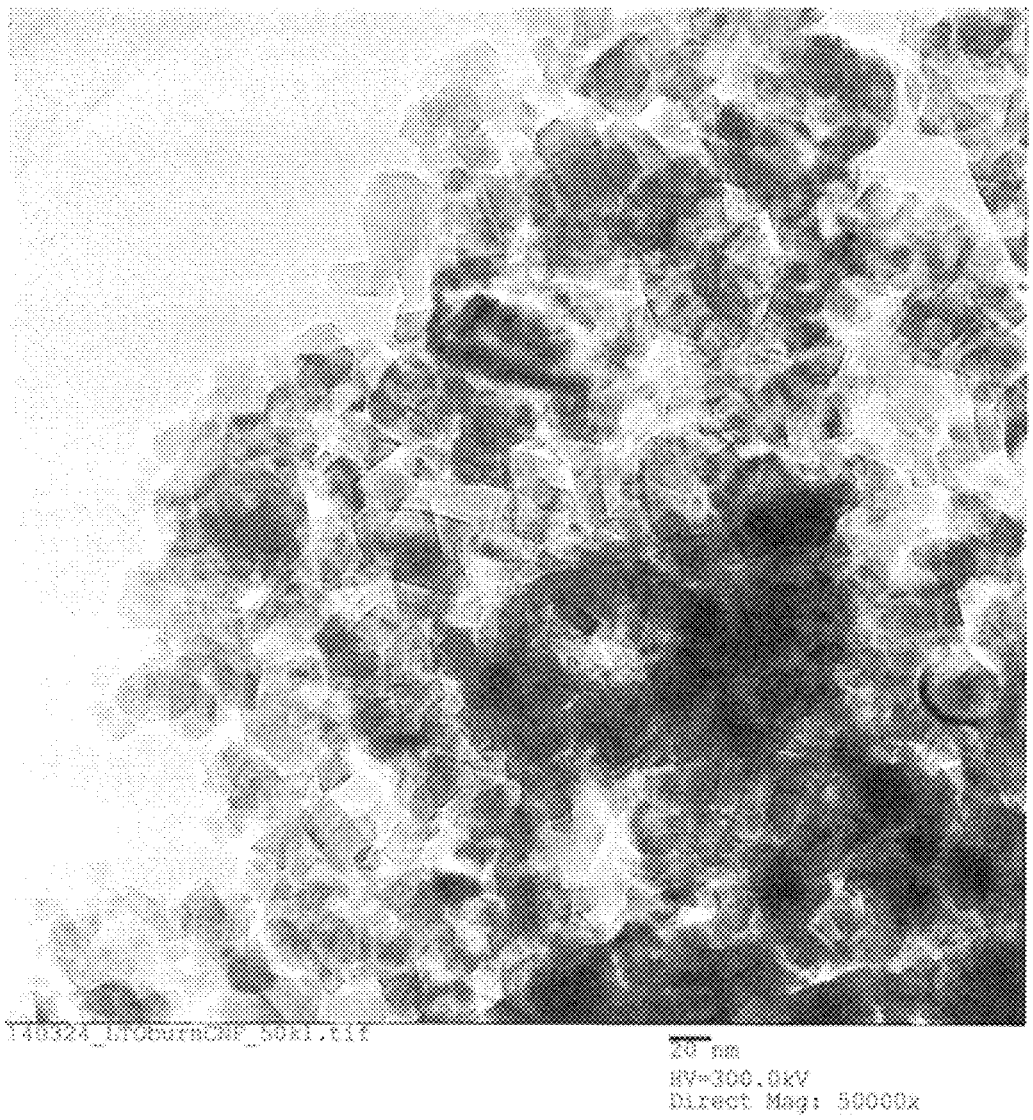
FIG. 4 is an HRTEM image with a focus on a crystallite part of metal compound particles of Example 1 with a magnification of 100,000.
Figure 5:
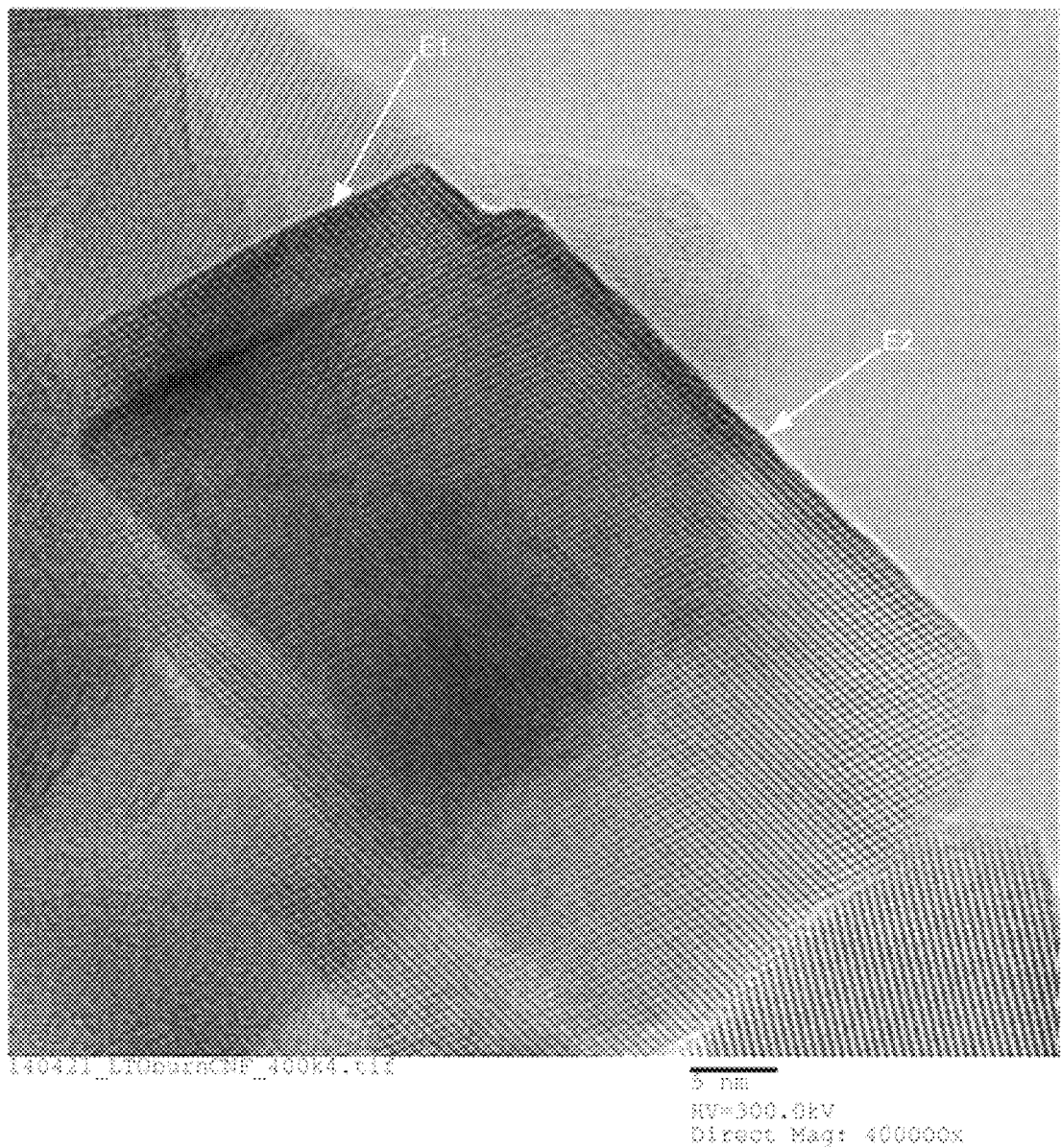
FIG. 5 is an HRTEM image with a focus on a crystallite part of metal compound particles of Example 1 with a magnification of 400,000.

Regarding the negative electrode active material obtained in Example 1, structural analysis of the final resultant product was performed. First, the entire particle image of the final resultant product and crystallites were captured using a scanning electron microscope, and a particle structure was analyzed. FIG. 3 is a TEM image obtained by capturing a cross section of the final resultant product with a magnification of 10,000. FIG. 4 is an HRTEM image with a focus on a crystallite part of the final resultant product using a high resolution transmission electron microscope with a magnification of 100,000. FIG. 5 is an HRTEM image with a focus on a crystallite part of the final resultant product using a high resolution transmission electron microscope with a magnification of 400,000.

As shown in FIG. 3, it can be understood that the final resultant product had a size of about 1.7 µm, and had a three-dimensional network structure as a whole, and included many nanosized voids 3. In addition, as shown in FIG. 4, it can be understood that primary particles had a flake shape and primary particles were bonded to each other on flat surfaces and end surfaces. In addition, as shown in FIG. 5, it can be understood that edges E1 and E2 on two sides with respect to the flat surface of the crystallite were dark as a whole and the flat surface and the edge of the crystallite were crystals with different materials.

Figure 6:
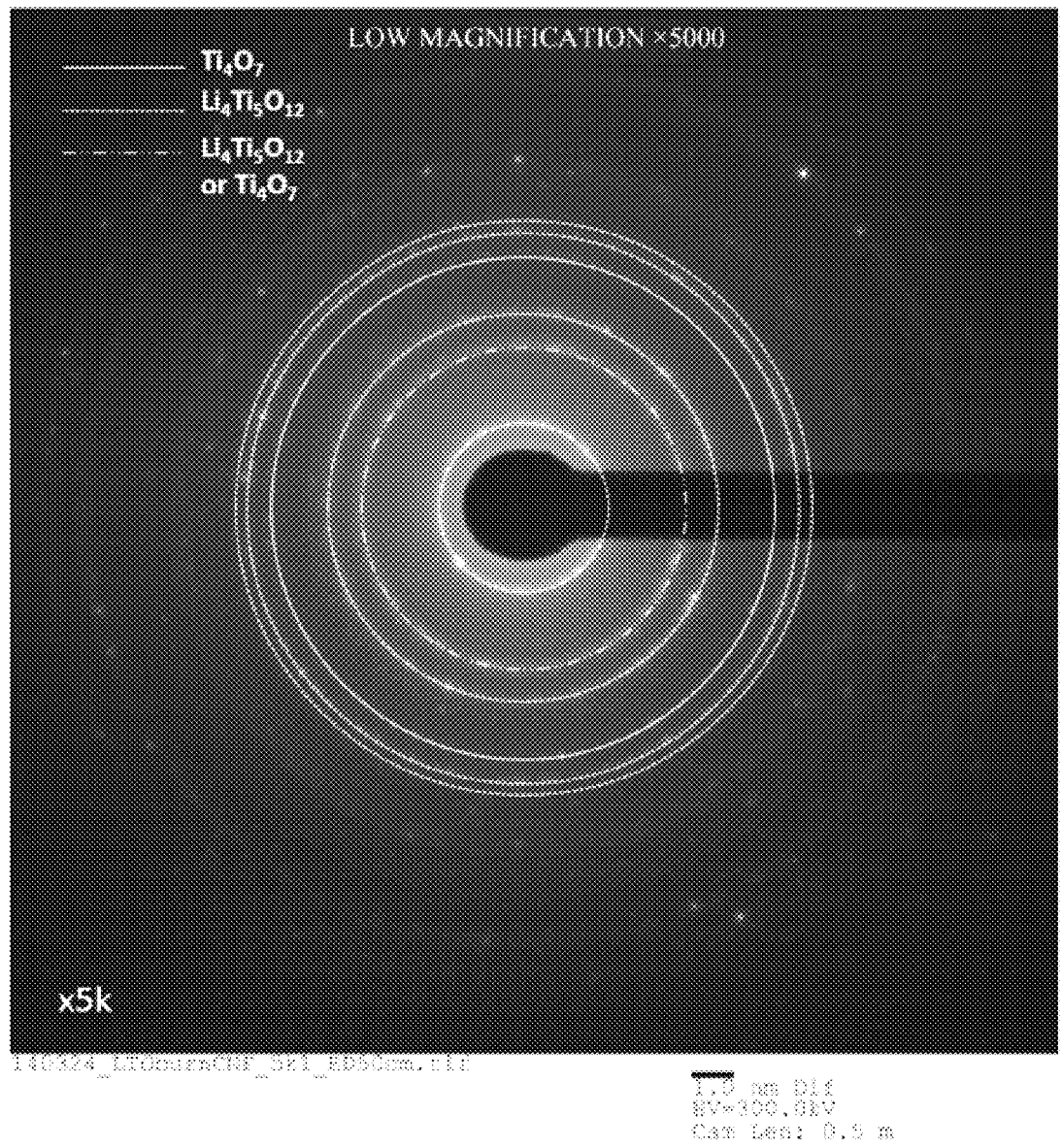
FIG. 6 is a restricted field of view ED diagram of metal compound particles of Example 1 with a magnification of 5,000.
Figure 7:
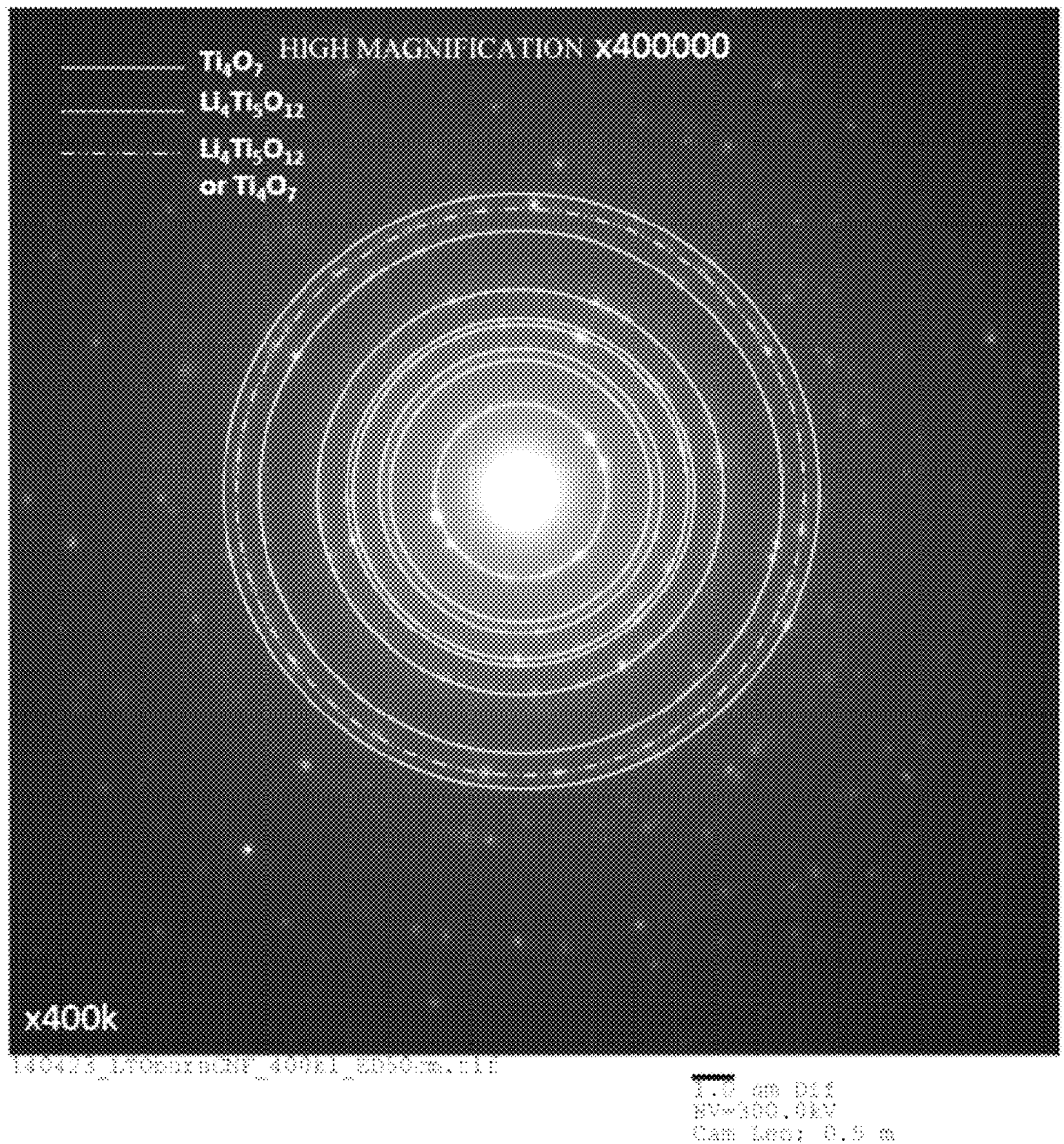
FIG. 7 is a restricted field of view ED diagram of metal compound particles of Example 1 with a magnification of 400,000.

In order to identify materials of the flat surface and the edge of the crystallite, the final resultant product was checked by a restricted field of view electron diffraction method. FIG. 6 is a restricted field of view ED diagram of the low magnification final resultant product with a low magnification of 5,000. FIG. 7 is a restricted field of view ED diagram of the high magnification final resultant product with a high magnification of 400,000. According to an actual measurement value based on a diffraction pattern with a low magnification of 5,000 shown in FIG. 6 and a result obtained by converting the actual measurement value into a interplanar distance d value (Å), and an actual measurement value based on a diffraction pattern with a high magnification of 400,000 shown in FIG. 7 and a result obtained by converting the actual measurement value into an interplanar distance d value (Å), it can be understood that, while most of the crystallites were composed of lithium titanate, a large amount of $Ti_4O_7$ was contained when observing with a high magnification.

Figure 8:
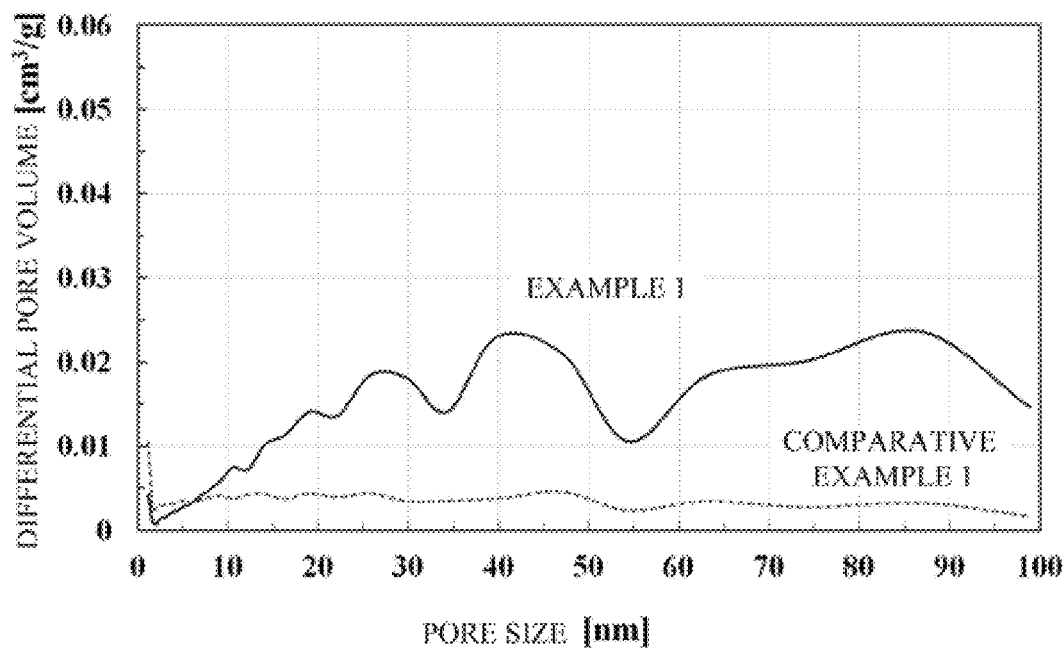
FIG. 8 is a diagram showing a differential pore volume of metal compound particles of Example 1.

As described above, it was confirmed that metal compound particles of the final resultant product as a whole had a card house structure in which crystallites of $Li_4Ti_5O_{12}$ were stacked, and were titanium oxide particles in which the edge surface of the crystallites of $Li_4Ti_5O_{12}$ was transformed into $Ti_4O_7$ Next, the pore distribution of the obtained lithium titanate particles of Example 1 and Comparative Example 1 was measured. As a measurement method, a nitrogen gas adsorption measurement method was used. Specifically, nitrogen gas was introduced to surfaces of metal oxide particles and into pores formed in the interior communicating with the surfaces of metal oxide particles, and an adsorption amount of nitrogen gas was obtained. Subsequently, a pressure of nitrogen gas introduced was gradually increased, an adsorption amount of nitrogen gas with respect to each equilibrium pressure was plotted, and an adsorption isothermal curve was obtained. In this example, a precision gas/vapor adsorption measurement instrument BELSORP-max-N (commercially available from Bel Japan Inc) was used for measurement. FIG. 8 is a differential pore volume distribution with a horizontal axis that represents a pore size and a vertical axis that represents an increment of a pore volume between measurement points.

As can be seen from FIG. 8, it can be understood that lithium titanate particles of Example 1 had a larger differential pore volume than lithium titanate particles of Comparative Example 1. It can be understood that, since a differential pore volume in such a range (100 nm) with a small pore size was large, an electrolytic solution entered the inside of lithium titanate particles, and an area of lithium titanate particles in contact with the electrolytic solution was large. In particular, a differential pore volume in a pore size range of 10 to 40 nm had a value of 0.01 $cm^3/g$ or more and additionally, a value of 0.02 $cm^3/g$ or more was obtained. Incidentally, when the diameter of the voids 3 in the TEM image in FIG. 3 was measured, the maximum diameter was about 500 nm. That is, it was confirmed that the voids 3 having a maximum diameter of about 500 nm and also fine voids indicated by a differential pore volume were included.

Next, an amount of the residual carbon in lithium titanate particles having a three-dimensional network structure was checked. In order to confirm the residual amount of carbon, negative electrode active materials of Example 1-1 and Example 1-2 were obtained by changing a heat treatment temperature and a heat treatment time in the third process for manufacturing metal compound particles having a three-dimensional network structure.

Example 1-1

In Example 1, 100 g of the resultant product obtained by performing a heat treatment in a nitrogen atmosphere was heated at 500° C. for 6 hours in an oxygen atmosphere. On the other hand, in Example 1-1, a negative electrode active material was obtained in the same manner as in Example 1 except that 100 g of the resultant product obtained by performing a heat treatment in a nitrogen atmosphere was heated at 350° C. for 3 hours.

Example 1-2

In Example 1, 100 g of the resultant product obtained by performing a heat treatment in a nitrogen atmosphere was heated at 500° C. for 6 hours in an oxygen atmosphere. On the other hand, in Example 1-2, a negative electrode active material was obtained in the same manner as in Example 1 except that 100 g of the resultant product obtained by performing a heat treatment in a nitrogen atmosphere was heated at 300° C. for 1 hour.

Using the negative electrode active materials of Example 1-1 and Example 1-2, a hybrid capacitor was produced using the same conditions and the same method as in Example 1. The residual amounts of carbon of the obtained negative electrode active materials of Example 1, Example 1-1 and Example 1-2 were confirmed by TG-DTA measurement (differential thermal-thermogravimetric simultaneous measurement). Here, a hybrid capacitor having a utilization ratio of 40% was used as a target for measuring the residual amount of carbon. Then, a storage test at 60° C. was performed for such examples. For storage test conditions, hybrid capacitors charged at 2.8 V were left for 30 minute, and were then left in an atmosphere at 60° C. for 1,500 hours. The discharging capacity when the capacitor was charged and discharged again was calculated as a fraction of the discharging capacity before the test. The results are shown in Table 2.

TABLE 2

| | Residual amount of carbon | Storage test |
|---|---|---|
| Example 1 | 1% or less | 83% |
| Example 1-1 | 3% | 72% |
| Example 1-2 | 5% | 66% |

As shown in Table 2, when carbon in metal compound particles was burned and a three-dimensional network structure was created, carbon may remain in metal compound particles. In Example 1, 1 weight % or less of carbon remained. As shown in Table 2, the residual amount of carbon was preferably less than 5 weight %, and particularly, a favorable result was obtained in Example 1 in which the residual amount of carbon was 1 weight % or less.

4-5. Evaluation of DCIR

Figure 9:
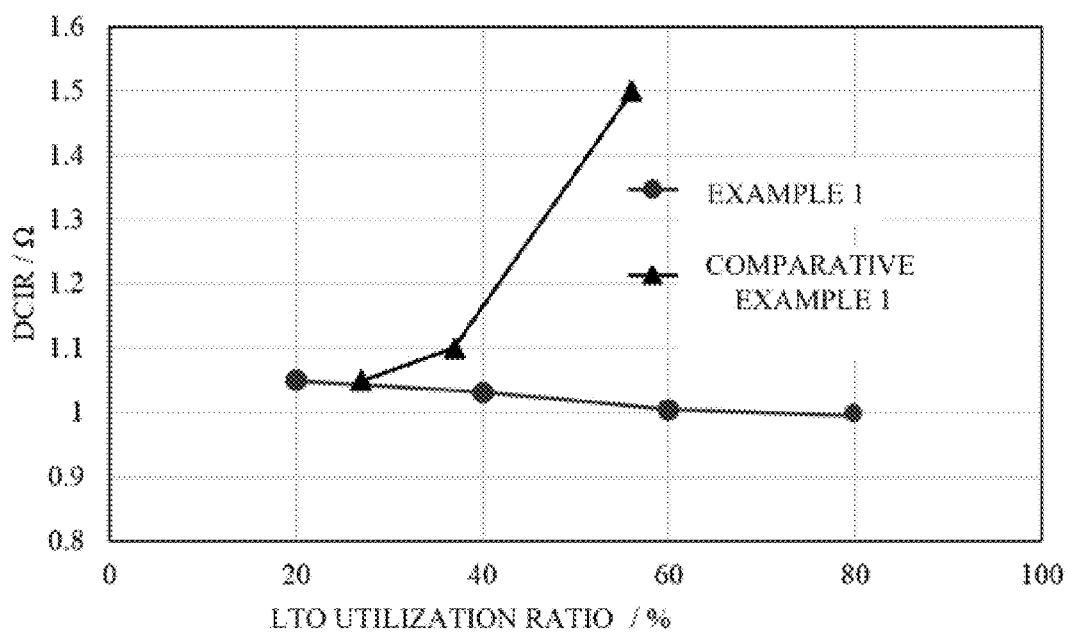
FIG. 9 is a graph showing the relationship between a utilization ratio of a negative electrode active material and an initial DCIR in Example 1 and a comparative example.

A charging and discharging cycle in which the hybrid capacitors of Example 1 and Comparative Example 1 were charged at room temperature at a current 12 mA until 2.8 V was reached, and maintained for 30 minutes at 2.8 V, and were discharged at a current of 12 mA until 1.5 V was reached was performed twice. A DCIR was calculated from the voltage drop when 1 second had elapsed from when discharging started in the second discharging. The test results are shown in FIG. 9. FIG. 9 is a graph showing the relationship between a utilization ratio of a negative electrode active material and an initial DCIR in Example 1 and a Comparative Example.

As shown in FIG. 9, in the hybrid capacitor of Comparative Example 1, lithium titanate particles of the related art were used as a negative electrode active material, and when the utilization ratio of the negative electrode active material increased, the direct current internal resistance increased accordingly, and increased sharply when the utilization ratio exceeded 45%.

On the other hand, in a hybrid capacitor of an example in which metal compound particles having a three-dimensional network structure were used as a negative electrode active material, it was confirmed that, when the utilization ratio of the negative electrode active material increased, the direct current internal resistance decreased. At least, even if the utilization ratio of the negative electrode active material increased, the direct current internal resistance did not increase sharply. In addition, at a utilization ratio of 20%, a direct current internal resistance of a hybrid capacitor of an example started at a point lower than a direct current internal resistance of the comparative example, and when at least the utilization ratio was 40% or more, the direct current internal resistance of the hybrid capacitor of the example had a large difference from the direct current internal resistance of the comparative example.

5-1. Example 2

This example was prepared in the same manner as in Example 1 except that a positive electrode and a negative electrode were wound with a rayon separator therebetween and accommodated in an aluminum case with a bottomed cylindrical shape, and thus a wound type hybrid capacitor was produced, and hybrid capacitors having different utilization ratios such that a utilization ratio of a negative electrode active material was 10% to 80% in 10% increments were prepared. Here, an aluminum case with an outer diameter of φ 45 mm, and a height of 135 mm was used.

5-2. Evaluation of Capacitor Capacitance and DCIR

Figure 10:
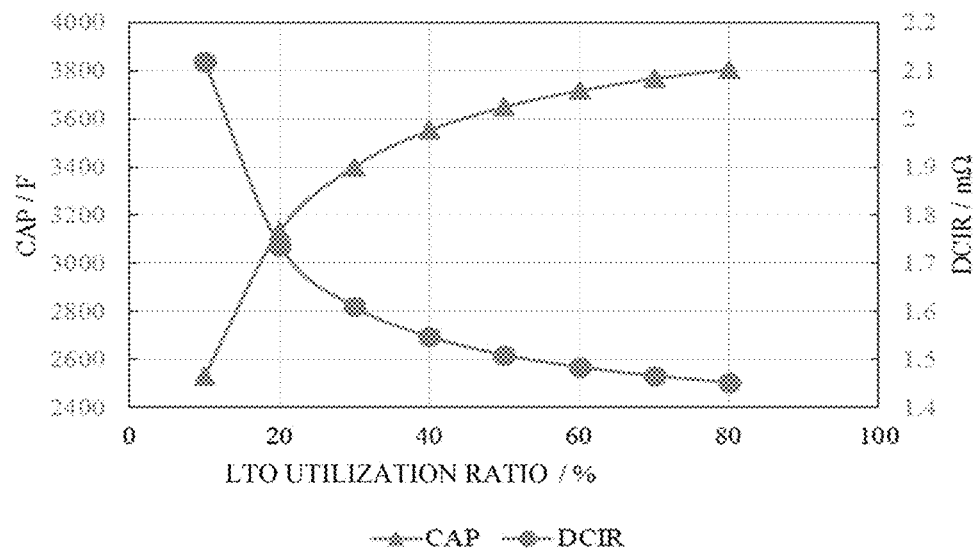
FIG. 10 is a graph showing relationships among a utilization ratio of a negative electrode active material and an initial DCIR and a capacitor capacitance in Example 2.

Using the hybrid capacitor of Example 2, a charging and discharging cycle in which, at room temperature, charging was performed at a current of 10 mA until 2.8 V was reached, the voltage was maintained at 2.8 V for 30 minutes, and discharging was performed at a current of 10 mA until 1.5 V was reached, was performed twice. A DCIR and a discharging capacity were calculated from the voltage drop when 1 second elapsed from when discharging started in the second discharging. The test results are shown in FIG. 10. FIG. 10 is a graph showing an initial DCIR and a discharging capacity with respect to a utilization ratio of the negative electrode active material of Example 1.

As shown in FIG. 10, for the hybrid capacitor of Example 2, it was confirmed that, when the utilization ratio of the negative electrode active material increased, the direct current internal resistance tended to decrease. It can be understood that, when a utilization ratio exceeded 80%, a degree of decrease in the direct current internal resistance declined, and even if the utilization ratio exceeded 80%, a further decrease in the direct current internal resistance would not be expected.

The hybrid capacitor of Example 2 was the same as the hybrid capacitor of Example 1 in that an increase in the direct current internal resistance was reduced even if at least the utilization ratio increased, but the hybrid capacitor of Example 2 had a different relationship between a utilization ratio and a direct current internal resistance from the hybrid capacitor of Example 1. That is, it was confirmed that, in the hybrid capacitor of Example 2, when the utilization ratio increased in a range in which the utilization ratio was less than 40%, the direct current internal resistance significantly decreased. That is, an effect of significantly lowering a direct current internal resistance according to an increase in the utilization ratio was obtained. However, the numerical value itself of the direct current internal resistance was not the same as when the utilization ratio was 40% or more.

In addition, as shown in FIG. 10, it was confirmed that, in the hybrid capacitor of Example 2, when a utilization ratio of the negative electrode active material increased, a discharging capacity tended to increase. It can be understood that, when a utilization ratio exceeded 80%, a degree of increase in the discharging capacity declined, and even if the utilization ratio exceeded 80%, a further increase in the discharging capacity would not be expected. On the other hand, it was confirmed that, in the hybrid capacitor of Example 2, in a range in which the utilization ratio was less than 40%, when the utilization ratio increased, a discharging capacity significantly increased, and an effect of increasing a discharging capacity according to an increase in the utilization ratio was strong. However, the numerical value itself of the discharging capacity cannot be said to be the same as that of the case in which the utilization ratio was 40% or more.

According to this result, it is assumed that, when Example 2 was of a wound type, if the negative electrode was made thicker in order to lower the utilization ratio of the negative electrode active material, there was an influence from the shortening of the current collector. That is, it is thought that, in lamination and sealing of Example 1, an accommodating volume was set according to the thickness of the negative electrode, but in Example 2, since the capacitor element was accommodated in a prescribed volume, the wound length was shorter according to the thickness of the negative electrode, the current collector was shortened, and the direct current internal resistance increased due to the current collector. This result showed that, even if the above point is considered, there was no change to the fact that, when at least the utilization ratio was in a range of 20% or more, even if the utilization ratio increased, an increase in the direct current internal resistance was reduced.

Therefore, regarding the wound type hybrid capacitor, when a degree of an improvement effect according to an increase in the utilization ratio is emphasized, the utilization ratio of the negative electrode active material is 20% or more and 80% or less, in other words, a discharging capacity of 100% of the negative electrode active material is 1.25 times or more and 5.0 times or less than a discharging capacity of 100% of the positive electrode active material. When the numerical value itself of the direct current internal resistance and the discharging capacity is emphasized, the utilization ratio of the negative electrode active material is 40% or more and 80% or less, in other words, a discharging capacity of 100% of the negative electrode active material is 1.25 times or more and 2.5 times or less than a discharging capacity of 100% of the positive electrode active material.

5-3. Charging and Discharging Curve

Figure 11:
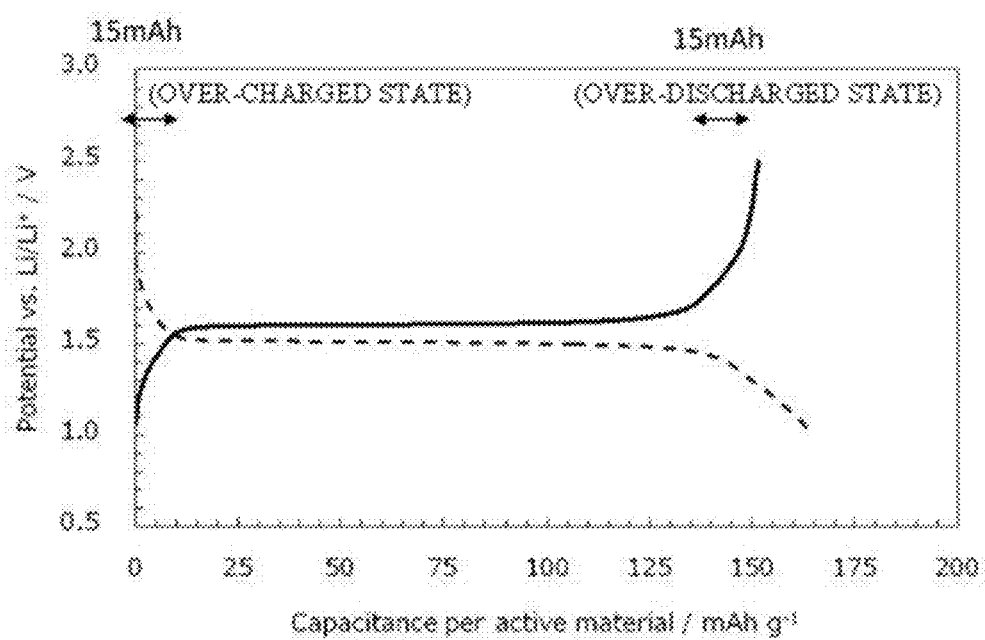
FIG. 11 is a graph showing a charging and discharging curve in Example 2.

A charging and discharging curve of the hybrid capacitor of Example 2 was checked. A potential of 1.0 V-2.5 V was maintained with respect to Li/Li$^+$, and at room temperature, a charging and discharging current of 1.65 mA/mg (12 C) flowed, and a charging and discharging capacity was measured. The test results are shown in FIG. 11. As shown in FIG. 11, a plateau region was 120 mAh/g with respect to a negative electrode capacity of 150 mAh/g. According to this result, it was confirmed that the utilization ratio of the negative electrode active material was desirably about 80%, in other words, a discharging capacity of 100% of the negative electrode active material was desirably 1.25 times a discharging capacity of 100% of the positive electrode active material.

The invention claimed is:

1. A hybrid capacitor comprising:
    a positive electrode comprising a layer of a positive electrode active material having an electrical double-layer capacitance; and
    a negative electrode having a negative electrode active material layer comprising metal compound particles having a three-dimensional network structure which can occlude and release lithium ions and in which primary particles are bonded to each other with voids,
    wherein a discharging capacity of 100% of the metal compound particles having the three-dimensional network structure is 1.25 times or more and 5.0 times or less than a discharging capacity of 100% of the positive electrode active material;
    the metal compound particles are lithium titanate;
    the metal compound particles have the three-dimensional network structure in which crystallites of lithium titanate are connected to each other; and
    a Magneli phase is formed on a part of the surfaces of the crystallites.

2. The hybrid capacitor according to claim 1, wherein the metal compound particles comprise less than 5 weight % carbon with respect to the metal compound particles.

3. The hybrid capacitor according to claim 2, wherein, in a differential pore volume converted from a pore distribution obtained by analyzing the metal compound particles using a nitrogen gas adsorption measurement method, the differential pore volume in a pore size range of 10 to 40 nm has a value of 0.01 cm$^3$/g or more.

4. The hybrid capacitor according to claim 1, wherein, in a differential pore volume converted from a pore distribution obtained by analyzing the metal compound particles using a nitrogen gas adsorption measurement method, the differential pore volume in a pore size range of 10 to 40 nm has a value of 0.01 cm$^3$/g or more.

5. A method for manufacturing a hybrid capacitor, comprising:
    a first process in which a precursor of metal compound particles and a carbon source are combined to obtain a first composite material;
    a second process in which the first composite material is heated under a non-oxidizing atmosphere to generate metal compound particles, and the metal compound particles and carbon are combined to obtain a second composite material;
    a third process in which the second composite material is heated under an oxygen atmosphere to obtain metal compound particles from which carbon is removed;
    a fourth process of preparing a negative electrode using the metal compound particles from which carbon is removed obtained in the third process as a negative electrode active material; and
    a fifth process of forming an element impregnated with an electrolytic solution in which a positive electrode and the negative electrode obtained in the fourth process face each other with a separator therebetween,
    wherein, in the fifth process, thicknesses of an active material layer in the positive electrode and an active material layer in the negative electrode are adjusted so that a discharging capacity of 100% of the metal compound particles having a three-dimensional network structure is 1.25 times or more and 5.0 times or less than a discharging capacity of 100% of the active material of the positive electrode.

6. A method for manufacturing a hybrid capacitor according to claim 5, wherein
    the metal compound particles have the three-dimensional network structure in which crystallites of lithium titanate are connected to each other, and
    a Magneli phase is formed on a part of the surfaces of the crystallites.

* * * * *